United States Patent [19]
Kerbow et al.

[11] Patent Number: 5,756,199
[45] Date of Patent: May 26, 1998

[54] GRAFTED FLUOROPOLYMER POWDERS AND METHOD OF MAKING THEREOF

[75] Inventors: Dewey Lynn Kerbow, Vienna, W. Va.; Hermann Jenewein, Geneva, Switzerland

[73] Assignee: E. I. du Pont de Nemours and Company, Wilmington, Del.

[21] Appl. No.: 701,412

[22] Filed: Aug. 22, 1996

Related U.S. Application Data

[62] Division of Ser. No. 281,725, Jul. 28, 1994, Pat. No. 5,576,106.

[51] Int. Cl.$^6$ .................................. B32B 5/16; B05D 7/00
[52] U.S. Cl. ........................ 428/327; 427/222; 427/302; 427/487; 427/521; 428/407
[58] Field of Search .......................... 427/212, 302, 427/222, 487, 521; 428/327, 403, 407

[56] References Cited

U.S. PATENT DOCUMENTS

| | | | |
|---|---|---|---|
| 3,716,391 | 2/1973 | Hosoda et al. | 427/302 |
| 4,151,225 | 4/1979 | Buning | 525/276 |
| 4,158,678 | 6/1979 | Tatemoto et al. | 522/141 |
| 4,278,777 | 7/1981 | Jakabhazy et al. | 525/276 |
| 4,472,557 | 9/1984 | Kawashima et al. | 525/276 |
| 4,506,035 | 3/1985 | Barnett et al. | 521/53 |
| 4,661,383 | 4/1987 | Elsenbaumer et al. | 427/302 |
| 4,910,258 | 3/1990 | Inoue et al. | 525/244 |

*Primary Examiner*—H. Thi Le

[57] ABSTRACT

Compounds containing polar functional entities can be grafted onto the surface of fluoropolymer powders to obtain grafted fluoropolymer powders having modified surface characteristics but without modifying the bulk of the polymer in the particle. The grafted fluoropolymer powder is effective in such uses as an adhesive to join dissimilar materials.

19 Claims, No Drawings

GRAFTED FLUOROPOLYMER POWDERS AND METHOD OF MAKING THEREOF

This is a division of application Ser. No. 08/281,725, filed Jul. 28, 1994 now U.S. Pat. No. 5,576,106.

FIELD OF THE INVENTION

This invention is in the field of the grafting of components onto fluoropolymers.

BACKGROUND OF THE INVENTION

The prior art on the grafting of monomers onto fluoropolymers to make grafted polymers deals with polymers having grafts throughout the bulk of the material.

The synthesis of graft fluoropolymers during the polymerization process is known. For example, Kawashima et al. in U.S. Pat. No. 4,472,557 and Inoue et al. in U.S. Pat. No. 4,910,258 disclose the grafting of a crystalline fluoropolymer segment onto an elastomeric fluoropolymer backbone containing peroxy groups. As a further example, Tatemoto et al. in U.S. Pat. No. 4,158,678 disclose a segmented polymer prepared by polymerizing the first segment in the presence of an iodinated compound which donates terminal iodine to the first segment, permitting the addition of a second polymer segment of different composition. In both of these approaches, the grafted segments are polymeric and are attached to essentially all of the backbone molecules or starting segments.

Buning in U.S. Pat. No. 4,151,225 discloses a process for preparing a graft polymer of polyvinylidene fluoride (PVDF) wherein the PVDF has grafted thereon a polymer of an ethylenically unsaturated compound. This process involves the penetration of a monomer and a radical forming catalyst into the PVDF powder or granules, followed by polymerizing said monomer. Consequently, the PVDF is converted to the graft copolymer uniformly throughout its bulk. Example 1 of Buning shows the grafting of methacrylic acid methyl ester onto PVDF. After subtracting the weight of material extracted from the graft copolymer obtained, the weight of graft material added by the grafting process is about 34 wt % based on the original weight of the PVDF, illustrating the mass increase that can be realized in a bulk grafting process using a polymerizable grafting compound.

Jakabhazy et al. in U.S. Pat. No. 4,278,777 discloses a method of grafting a vinyl monomer onto a polymer having an aliphatic carbon-hydrogen group. This method comprises the swelling of the polymer with a solvent which will effect swelling, though typically not dissolution, with resultant grafting of the monomer onto the polymer throughout the bulk of the polymer, using a polymerization initiator to effect the graft.

Processes typified by those of Jakabhazy et al. and of Buning are not readily adaptable to polymers which are not easily swollen, such as copolymers of ethylene and tetrafluoroethylene and perhalogenated polymers. Furthermore, these processes produce bulk modification which may not be necessary or desirable.

It is sometimes desired to have composite structures of certain dissimilar materials, for example, a fluoropolymer and a polyamide or a polyester elastomer, to take advantage of certain properties of each, or to adhere a fluoropolymer to a metal to provide the metal surface with fluoropolymer characteristics.

SUMMARY OF THE INVENTION

This invention provides a grafted fluoropolymer powder, having grafted only on the surface of the powder particles an ethylenically unsaturated compound. Preferably, the concentration of grafted compound is in the range of from about 0.1 wt % to about 5 wt % based on the total mass of powder, more preferably from 0.2 wt % to 3 wt %, most preferably from 0.2 wt % to 2 wt %. Maleic anhydride is a preferred grafting compound.

This invention also provides a process for grafting a compound onto the surface of fluoropolymer powder, comprising exposing fluoropolymer powder to a source of ionizing radiation in the presence of an ethylenically unsaturated compound.

The invention further provides a process for bonding fluoropolymer to another material, comprising bringing said fluoropolymer and said material together, in contact with one another, said fluoropolymer being either in the form of powder or melt mixture thereof, said powder having a compound grafted only to the surface thereof, either the grafted compound portion of said powder being compatible with said material or the fluoropolymer portion of said powder being compatible with said material, and heating the resultant assemblage of said material and said powder or melt mixture thereof to cause said material and said fluoropolymer to bond together. An additional material can be present in contact with said powder or melt mixture thereof.

The invention also provides laminates comprising grafted fluoropolymer powder, either fused or melt mixed.

DETAILED DESCRIPTION

It has been discovered that compounds can be grafted onto the surface of fluoropolymer powders to obtain grafted powders having modified surface characteristics, depending on the pendant moieties grafted onto the powder surface, but without modifying the bulk of the polymer in the particle. Even though the grafting compound is grafted only onto the surface of the powder particle, the resultant grafted fluoropolymer powder is surprisingly effective in such uses as an adhesive to join dissimilar materials when the pendant moieties of the grafted compound contain polar functional groups. Yet, the grafted fluoropolymer powder retains compatibility with the base fluoropolymer or similar polymer with which the base fluoropolymer is compatible. As such, the grafted fluoropolymer powder provides a convenient means to achieve a strong bond between such dissimilar materials without undesirable modification of the bulk characteristics of one or both materials or without cumbersome and expensive treatments of intermediate structural components.

Fluoropolymers that can be used as bases for the grafted fluoropolymer powders of this invention are polymers of at least one fluorine-containing monomer, but may incorporate monomers containing no fluorine or other halogen. Fluorine-containing monomers include perhalogenated monomers and partially-halogenated monomers (hydrohalomonomers). Preferably, at least one monomer contains hydrogen. Fluorinated monomers include those in the group consisting of fluoroolefins having 2–8 carbon atoms, and fluorinated vinyl ethers (FVE) of the formula $CY_2=CYOR$ or $CY_2=CYOR'OR$ wherein Y is H or F, and —R, and —R'— are independently completely-fluorinated or partially-fluorinated linear or branched alkyl and alkylene groups containing 1–8 carbon atoms. Preferred —R groups contain 1–4 carbon atoms and are preferably perfluorinated. Preferred —R'— groups contain 2–4 carbon atoms and are preferably perfluorinated. Hydrocarbon monomers that can be used include but are not limited to ethylene, propylene, n-butylene, isobutylene, and the like. Fluoropolymers useful in this invention include but are not limited to the group of copolymers of ethylene (E) with perhalogenated comonomers. When perhalogenated comonomer with ethylene is tetrafluoroethylene (TFE), minor amounts of at least one additional monomer are commonly used to prevent high-temperature brittleness, with perfluoro(propyl vinyl ether) (PPVE), perfluorobutyl ethylene (PFBE), and hexafluoroisobutylene (HFIB) being among preferred additional monomers. Other fluoropolymers that can be used are chliorotrifluoroethylene (CTFE) polymers, including E/CTFE copolymers, optionally containing modifying comonomers; vinylidene fluoride (VF2) polymers including homopolymers and VF2 copolymers with one or more perfluoroolefins, particularly including HFP and optionally TFE; and vinyl fluoride homopolymers and copolymers. Examples of perfluorinated copolymers that can be used include copolymers of TFE with hexafluoropropylene (HFP) and/or PPVE. Such fluoropolymers are commonly but not necessarily melt-fabricable. As such, they generally have melt viscosity in the range $0.5 \times 10^3$ to $60 \times 10^3$ Pa·s, but viscosities outside this range are known.

The fluoropolymers used as bases for grafting in this invention, and therefore the grafted fluoropolymers of this invention, are in finely-divided particulate form. Various terms used to characterize such particulate include fluff, powder, dust, and the like. All such names are encompassed herein by the term powder. The dimensions of the powder of this invention can be in a fairly broad range, depending on the desired use of the grafted powder. However, if the powder is too fine, it may not flow well and consequently be difficult to handle, or it may be easily blown about and therefore difficult to contain. On the other hand, if the powder is too coarse, it will not lend itself well to some potential uses such as formation of thin layers, or to some potential deposition techniques such as powder coating or deposition from a slurry, and the density of grafted entities on a mass basis will be relatively low because of low surface area. There is no particular limit on particle size, but weight average particle size of suitable fluoropolymer powders is ordinarily in the range of about 50–500 μm. Powders having any particle size distribution, e.g., narrow, broad, unimodal, bimodal, symmetrical, asymmetrical, etc., can be grafted. The average particle size (specific surface area) and the particle size distribution can be tailored to the intended use of the grafted powder by screening or by other methods of classification, as is well known.

Compounds that can be grafted onto fluoropolymer powder particles are ethylenically unsaturated. Since modification of the fluoropolymer particle surface, e.g., the surface energy, is a desired result, the grafting compound will usually contain a polar functional group. Desired, but not required, characteristics of the grafting compound include the ability to migrate to activated sites on the fluoropolymer powder particle surface during the grafting process. Mobility (ability to migrate) can follow from formation of a vapor atomosphere, which is a preferred mechanism. Alternatively, the grafting compound should be capable of deposition as a uniform thin coating on the particle surface, such as by coating with a solution of the grafting compound and evaporation of the solvent. Desirably, grafting compounds are not readily soluble in the fluoropolymer in order that grafting take place at or near the fluoropolymer particle surface. Preferably, the grafting compound should not easily homopolymerize away from or unattached to the base fluoropolymer.

Preferably, also, the grafting compound should not contain a hydrodgen atom or other entity having capability to transfer to and deactivate a radical grafting site on the fluoropolymer particle surface. Useful ethylenically unsaturated grafting compounds include acids, e.g., carboxylic, sulfonic, and phosphonic acids, preferably the diacids, esters, and anhydrides. Examples of such compounds include diethyl maleate, maleic anhydride, halogen-substituted maleic anhydrides such as dichloromaleic anhydride and difluoromaleic anhydride, itaconic anyhdride, citraconic anhydride, glutaconic anhydride, ester-functional fluoro(vinyl ether), styrene, and the like. It is not necessary that the grafting component have more than one ethylenically unsaturated group. Maleic anhydride is a preferred grafting compound. The expressions "grafted fluoropolymer powder" or "grafted powder" or the like as used herein means the powder having the grafting compound grafted thereto.

The grafted powders of this invention can be prepared in various ways. It appears to be necessary only that the fluoropolymer powder and the grafting compound be brought into proximity in the presence of ionizing radiation effective to cause said compound to graft to said powder particle. That is, the irradiation of the fluoropolymer powder is carried out in the presence of the grafting compound. If the grafting compound has adequate vapor pressure, it can suffice to form a simple mixture of powder and grafting compound, and expose the mixture to radiation. It is believed that the mobility of the grafting compound molecules enables them to migrate to grafting sites created by irradiation on the surface of the fluoropolymer particle. While sufficiently high vapor pressure may reflect molecular mobility that facilitates this process, it also presents a mechanism for escape of the grafting compound, so it is desirable to contain the mixture, e.g., in a container such as a plastic bag, to prevent uncontrolled escape of the grafting compound and to enhance reproducibility. As an alternative to forming a simple mixture of powder and grafting compound, the powder can be wetted with a solution of the grafting compound in a carrier solvent having higher vapor pressure than the grafting compound and subsequently evaporating the solvent, thereby coating the powder particles with the grafting compound. This technique can be employed with grafting compounds that are either liquid or solid, but is more useful for grafting compounds with high vapor pressure because of difficulty in controlling grafting compound loss during solvent evaporation. For maleic anhydride, and other grafting compounds with comparable or higher vapor pressure, irradiation of a simple physical mixture of grafting compound and fluoropolymer powder in a sealed polyethylene bag is a preferred method because of its simplicity, ease of control, and reproducibility of results.

In the grafting process of this invention, no solvent or material that will swell the fluoropolymer is used. Consequently, it is believed that the ethylenically unsaturated grafting compound has access only to the surface of the powder particle so that grafting takes place only at the surface of the fluoropolymer powder particle. It is possible that some small amount of grafting occurs just below the surface of the particle, but not throughout the bulk of the particle, this being the meaning of the grafting occurring only at the particle surface.

Any type of ionizing radiation effective to cause the grafting reaction between fluoropolymer and ethylenically unsaturated compound is suitable. High-energy electrons are a preferred ionizing radiation. Electron energies in the range of a few Mev (million electronvolt) are readily available, and 3 Mev has been found to be convenient. The total radiation dose should be controlled to obtain adequate grafting sites without significant degradation of fluoropolymer molecular weight. Doses in the range of about 2–6 Mrad (megarad) have been used in this work. The grafting process works by the activated or grafting sites on the surface of the fluoropolymer powder reacting with the ethylenic unsaturated group of the grafting compound to form chemical bonding believed to be covalent, between the powder surface and the grafting compound.

It is possible to carry out chemical reactions on the grafted powder to alter the grafted entity and thereby achieve different surface effects. Products of derivative reactions are typically acids, or salts thereof. For example, a powder having been grafted with maleic anhydride can be reacted with aqueous base to produce ionomeric side groups with chemical and physical properties different from the parent anhydride graft. Such derivatized grafted fluoropolymer powders are considered to be grafted fluoropolymer powders within the scope of the invention. As one skilled in the art will recognize, different grafting compounds or different derivatizing reactions will be used for different purposes, e.g., to promote interaction with different materials.

The grafted fluoropolymer powders of this invention are well suited for use in conjunction with materials of composition unlike the base fluoropolymer. Because of the change of surface characteristics due to grafted entity, the grafted powder is compatible with unlike materials to be able to bond to them. Still, the grafted fluoropolymer powder retains sufficient base fluoropolymer character to be compatible with base fluoropolymer and similar fluoropolymers. Thus, the grafted fluoropolymer powder can be bonded to another material, either the grafted compound portion of said powder being compatible with said material or the fluoropolymer portion of said powder being compatible with said material. This makes the grafted fluoropolymer useful to enhance interfacial interaction between dissimilar materials, one of which is ordinarily base fluoropolymer or compatible with base fluoropolymer and similar fluoropolymers. The grafted powder can be used, for example, as an adhesive interlayer (or priming layer) in forming laminates of base fluoropolymer and unlike material such as other polymer or metal, and such use is within the scope of the inventon. The interface need not be extended as in a macroscopic laminate, and could be interface of one material dispersed in another, e.g., as the interface of a filler particles of the same or different identities and host fluoropolymer in a filled fluoropolymer, and such use is within the scope of the invention. Thus, this invention provides a convenient way to achieve a strong bond between such dissimilar materials without undesirable modification of the bulk characteristics of one or both materials or without cumbersome and expensive treatments of intermediate structural components. The process for such bonding comprises bringing grafted fluoropolymer powder, either in the form of powder or melt mixture thereof, and another material together, in contact with one another, and heating the resultant assemblage of said material and said powder or melt mixture thereof to cause said material and said fluoropolymer to bond together. It is understood that the bringing together of powder or melt mixture thereof and other material and the heating need not occur in the stated sequence. For example, powder and other material can be brought together in the solid state and then heated. Another alternative, for example, is to bring the melts of powder and other material together. Under the application of heat, dual compatibility of the grafted fluoropolymer powder enables the fluoropolymer of the powder to fuse with, or to wet and thus bond to, other material that is compatible with base fluoropolymer of the powder, and the grafted compound portion of the powder to fuse with, or to wet and thus bond to, other material that is compatible with the grafted portion of the powder. To facilitate bonding of grafted fluoropolymer powder to dissimilar other material, various additives can be used in said other material to promote bonding, depending on the other material. Examples of such additives are catalysts and curing agents known in the art. When other material is thermoplastic polyester elastomer composition, it can be advantageous, for example, to use amine catalyst. Amine catalyst functions, for example, to catalyze formation of covalent bonds between anhydride groups of grafted fluoropolymer powder and alcohol groups of polyester elastomer.

As one skilled in the art will recognize, grafted fluoropolymer powder can be used in many ways. Grafted powder, for example, can be sprinkled or dusted into place, can be applied to a surface from a dispersion or slurry, can be mixed with other powder or liquid as a binder or for other purposes, or can be distributed on a surface by one of several powder coating techniques such as electrostatic spraying or fluidized bed coating. Normally, the grafted powder will be fused in place by heating the powder above the melting temperature of the base fluoropolymer, commonly with the application of pressure to create intimacy of contact between the powder and the surface or other material to be bonded to the grafted fluoropolymer powder. While the grafted powder may be used to create a free surface, there is particular value in using it as an intermediate between two other materials, one of which advantageously can be of base fluoropolymer. Thus, deposition of grafted fluoropolymer powder at an interface between two other materials can be achieved in closely coupled operations or in operations separated both in time and place. For example, the grafted powder can be deposited on the surface of one material, followed by placement of a second material, followed by a single heating step. Alternatively, the grafted powder can be attached to one material, and then mated with a second material at a different time in a different place. Various such combinations of steps will readily occur to one skilled in the art.

Surprisingly, it was discovered that grafted powder can also be used effectively for certain purposes even when processed by means involving melt shear that presumably eliminate distinction between surface and interior of the grafted powder particles. Because of the low density of grafted compound based on weight of fluoropolymer, it had been anticipated that dilution of the surface graft population with ungrafted fluoropolymer from the powder particle interior would severely diminish the effectiveness of the grafted powder, as, for example, in bonding to dissimilar materials. In fact, strong bonds to other materials, e.g., polyamides, can be formed even when the grafted fluoropolymer powder is processed through a melt mixing device such as an extruder. This permits fabrication of articles incorporating grafted fluoropolymer powder by techniques such as co-extrusion. When co-extrusion techniques are used to form multilayer structures, the component melt streams should be in contact for sufficient time to permit formation of the desired bond between component materials.

Laminates having grafted fluoropolymer powder as bonding layer between two other materials, generally dissimilar and one of which is ordinarily fluoropolymer similar to (compatible with) the base fluoropolymer of said grafted fluoropolymer powder as indicated by being melt miscible or melt wettable, can have various geometries and various uses as recognized by one skilled in the art. Such laminates can, for example, be planar in the form of film or sheet, or tubular in the form of pipe or hose, of circular or other cross-sectional configuration. Such laminates can be flexible or rigid, depending on component materials and their dimensions. The materials being bonded together can be made entirely of their respective materials, or can be can be articles containing the materials or articles of which the materials form a part thereof, e.g., a coating. A wide variety of materials can be used in such laminates, including metals and other polymers such as polyamides or polyesters including thermoplastic polyester elastomers. In particular, for composite hose and pipe constructions, the present invention permits the use of the best combination of materials for transporting fluids and providing protection and integrity of these constructions under the conditions of use.

EXAMPLES

For several of the following examples, the hydrogen-containing fluoropolymer powder used was a copolymer of ethylene (E), tetrafluoroethylene (TFE), and perfluorobutyl ethylene (PFBE) having E/TFE molar ratio of about 0.9, about 1 mol % PFBE, and melt flow rate (MFR) of about 7 g/10 min as measured according to ASTM D-3159. The polymer was prepared generally by the method of U.S. Pat. No. 3,624,250 as a finely-divided fluff or powder. This fluff was refined for grafting experiments by passing it through a comminuting machine (Fitzmill®, Fitzpatrick Co.) using a screen with 0.04-inch (1.0-mm) openings. Average particle size was about 100–120 μm as determined by U.S. Standard screen analysis. Unless otherwise specified, the powder exiting the Fitzmill® (ETFE powder) was used without fractionation. Other powders tested are described in the pertinent examples.

Samples for irradiation were placed in polyethylene bags having integral mechanical sealing lips and sealed after expelling air by hand pressing. Bag loading was such that, when the loaded bag was laid flat and the powder was spread uniformly, the powder layer was about 2 cm thick with area density of about 4 g/cm$^2$ for ETFE powder. Samples were irradiated using 3 Mev electrons. Total dose was varied by varying the time of exposure to the electron beam. High exposures were achieved using multiple passes through the beam to avoid sample overheating.

Polymer samples were analyzed for the presence of grafted entities by Fourier transform infrared (FTIR) spectroscopy with resolution of approximately 4 cm$^{-1}$. The absorbances due to grafted entities were isolated from the major absorbances of the substrate polymer using a spectral subtraction technique with a sample of ungrafted polymer as a reference. Two methods of preparing thin film (0.002–0.010 inch, 0.05–0.25 mm) samples for FTIR were used. If the polymer was thought to be thermally sensitive, a film was pressed at room temperature using a KBr mini-press pellet maker (Wilmad Co., catalog number 4032) but without KBr. Otherwise, a heated platen press was used at temperature about 5°–20° C. above the melting point of the polymer.

Quantitative estimates of maleic anhydride graft concentrations on ETFE powder were made by combining the results of FTIR spectra for two powders with different graft concentrations and the results from hydrolysis of the grafted anhydride and back-titration with caustic for the same two grafted powders.

Unless otherwise stated, adhesion of grafted powder to various surfaces was tested by the following procedure. Aluminum sheet 0.005 inch (0.13 mm) thick, 8 inches (20 cm) square, and having mirror finish (VWR Scientific Mfg. Co.) was prepared by rinsing thoroughly with isopropanol to remove traces of grease and fingerprints. Polymer powder was first slurried with enough isopropanol to create a pourable suspension, about 3 g powder in 10 ml isopropanol. The suspension was smoothly doctored over the prepared aluminum sheet using a #36 wire-wound rod (R.S. Specialties Co.), a 0.5-inch-diameter (1.3 cm) rod 16 inches (40 cm) long wound over 12 inches (30 cm) of length with 0.036 inch (0.9 mm) stainless steel wire. In this operation, the isopropanol facilitates distribution of the powder and prevents problems due to static electricity. The isopropanol was allowed to evaporate. Weight gain of the aluminum sheet indicated that the preceding procedure produced a powder coating of about 0.15±0.02 g/cm$^2$. On this coated sheet, still in the horizontal position, was first placed a piece of polyimide film (KAPTON®, DuPont Co.) over half of the coated sheet, and then a molded sheet of the same or a different polymer, another aluminum sheet, or a similarly prepared second coated sheet. The construction was then compressed in a platen press at temperature and pressure appropriate to the polymer of the substrate powder used. After removal from the press, the laminate was immediately quenched in ice water and cut into one-inch (2.5-cm) strips. The layers of the laminate strips were separated at the polyimide parting film, and fastened in the jaws of a tensile tester (Instron). The moving jaw was driven at a speed of one inch/min (2.5 cm/min) to peel the layers apart, holding the free end of the laminate at an angle of 90° with respect to the line of the jaws. Average force to peel the strips apart was recorded, and is reported in force per unit width of strip.

Example 1

ETFE powder as described above was combined with reagent grade maleic anhydride (Kodak) which had been pulverized to a bulky powder with a mortar and pestle in the powder/anhydride ratio of 100/1, placed in a polyethylene bag, and mixed by shaking and kneading the bag. Air was expelled, the bag was sealed, and the sample was subjected to 6 Mrad total irradiation. A portion of the irradiated sample was heated overnight at 120° C. to drive off any unreacted maleic anhydride for use in the analysis and in the adhesion tests reported here. The grafted powder was compression molded into a film at 300° C. and analyzed by FTIR. The difference spectrum, representing the result of maleic anhydride grafting, showed a single major peak at about 1792 cm$^{-1}$. A sample of the mixture of ETFE powder and maleic anhydride that had not been irradiated was also molded and analyzed. The FTIR difference spectrum showed a doublet at about 1785 and 1795 cm$^{-1}$. Conversion of the doublet into a single peak indicated grafting. Basic hydrolysis and back-titration, coupled with FTIR analysis, indicated that the concentration of grafted maleic anhydride was about 0.4 wt %.

The molded films prepared in the preceding paragraph were marked with a permanent marker (Sharpie®, Sanford Corp.) and the ink was allowed to dry for one minute. Using an absorbent tissue, the marks were rubbed vigorously by hand. The marking ink was immediately removed from the control, while no visible change was detected in the density of the mark on the grafted sample. Durability of the mark confirms that grafting had occurred.

The grafted powder was used to prepare a laminate with aluminum on both sides, as described above using two coated sheets of aluminum. A control was also prepared using the ETFE powder without graft or maleic anhydride addition. Both laminates were pressed at 300° C. under 5000 lb (2273 kg) force for 5 minutes. Average peel force for the laminate with grafted powder was 3.0 lb (1.4 kg), but only 0.5 lb (0.23 kg) for the control.

Two additional laminates were prepared, one having ETFE film on one side and film formed from a nylon resin (Zytel® grade 101, DuPont Co.) on the other side and the second laminate having ETFE film one one side and film formed from a filled polyester engineering thermoplastic resin (Rynite® grade 6400) on the other, each laminate having the grafted ETFE powder in the middle. Each laminate was prepared generally as above except that the laminates were pressed at 265° C. Each laminate exhibited strong adhesion of the films making up the laminates. Peel force for the ETFE/grafted powder/nylon laminate varied, with values up to 16 lb. (7.3 kg) being obtained. Peel force was 15.0 lb (6.8 kg) for the filled polyester sample. Control laminates made of the ETFE film and the filled polyester film and the ETFE film and nylon film, each without the grafted fluoropolymer powder interlayer, fell apart without peel testing.

Example 2

The procedure of Example 1 was repeated, except that ratio of ETFE powder to maleic anhydride was 100/10. FTIR analysis and titration indicated that the irradiated product contained about 1.2 wt % of grafted maleic anhydride. Peel force was 3.8 lb (1.7 kg) in the test of adhesion to aluminum.

Example 3

The procedure of Example 1 was repeated, except that a commercial polyvinylidene fluoride (PVDF) powder (Kynar® grade 461, Pennwalt) was used instead of ETFE powder. Visually, the PVDF powder appeared similar to the ETFE powder. The FTIR difference spectrum for a compression molded film of the irradiated product showed a single major peak at about 1783 cm$^{-1}$. Peel force was 2.1 lb (0.95 kg) in the test of adhesion to aluminum, compared to 0.8 lb (0.36 kg) for the ungrafted control.

Example 4

Maleic anhydride (0.964 g) was dissolved in about 500 ml of acetone, and the solution was added to 155 g of ETFE powder similar to that described above, but which had been passed through a No. 100 U.S. Standard screen to remove all particles larger than 149 μm and had not been refined by passage through the Fitzmill®. This powder had specific surface area of 6.8 m$^2$/g, measured by nitrogen adsorption. The acetone was removed under vacuum and with continuous stirring, using a vacuum rotary evaporator (Rotovapor-R®, Buchi Laboratoriums-Technik) at room temperature to minimize sublimation loss of maleic anhydride. The dry mixture was packaged in a polyethylene bag and irradiated with a 3 Mrad dose. The irradiated sample was rinsed with acetone and filtered to remove any ungrafted maleic anhydride or potential maleic anhydride oligomers, and dried in an air oven. The presence of grafted maleic anhydride was indicated by a single major peak at 1795 cm$^{-1}$ in the FTIR difference spectrum for a compression molded film.

The grafted ETFE powder was blended with a 6,6-polyamide powder (precursor to Zytel® grade 101, DuPont Co.) in the ratio ETFE/nylon=67/33 by weight. This blend was compression molded into films about 0.01 inch (0.25 mm) thick. Films were also molded from a similar blend using ungrafted ETFE powder, from the ungrafted ETFE powder alone, and from the nylon alone to serve as controls. Tensile strength (TS) and elongation (El) measured at room temperature for each film are summarized in Table 2. As shown, elongation is very low for the blend containing ungrafted ETFE. Elongation is substantially higher for the blend containing grafted ETFE, indicating that the grafted surface of the fluoropolymer powder improves the interaction with the nylon phase.

TABLE 2

| Tensile Properties for ETFE/Nylon Blends | | | |
|---|---|---|---|
| ETFE/nylon | Graft | TS (psi) | El (%) |
| 100/0 | none | 6360 | 265 |
| 0/100 | — | 8000 | 20 |
| 67/33 | none | 5350 | 10 |
| 67/33 | Ex.4 | 6600 | 165 |
| 67/33 | Ex.5 | 5380 | 115 |

Example 5

The procedure of Example 4 was repeated, except that 1.03 ml of diethyl maleate was dissolved in the acetone instead of maleic anhydride. The FTIR difference spectrum for a compression molded film showed a single absorbance at 1741 cm$^{-1}$. When the molded film was marked with a permanent marker and rubbed with a tissue as in Example 1, about half of the ink was removed.

A blend of the grafted powder with nylon was prepared, molded, and tested for tensile properties as in Example 4. Results are included in Table 2. In this instance, also, enhanced elongation indicates that the ester grafts on the ETFE particle surface improved interaction with the nylon.

Example 6

Grafted ETFE powder (100 g) prepared generally as in Example 1 was added to a 30/70 by volume isopropanol/water mixture (1000 ml). To this mixture were added 4 g of NaOH and the resultant mixture was refluxed for approximately 1 hr. After cooling, the mixture was filtered, washed with demineralized water, and dried in a vacuum oven at 150° C. A portion of the recovered powder was compression molded into a film and analyzed by FTIR. The spectrum showed the absence of absorbtion at 1792 cm$^{-1}$ and a broad absorbance at about 1590 cm$^{-1}$ that indicated the presence of the sodium salt of diacid derived from the maleic anhydride graft. Peel force was 4.8 lb (2.2 kg) in the test of adhesion to aluminum, an increase over the peel force obtained in Example 1. A laminate having ETFE film on one side and film formed from a thermoplastic polyester elastomer (Hytrel® grade 7246, DuPont Co.) on the other, and the derivatized grafted ETFE powder in the middle, was prepared as in Example 1. Peel force was 4.5 lb (2.0 kg), while a control laminate made without derivatized grafted ETFE powder exhibited zero peel strength. These results show that useful post-reactions can be carried out on the surface-grafted fluoropolymer powder. This test also provides supporting evidence that the graft occurs on the powder particle surface only, because ETFE resin is neither dissolved nor swollen by isopropanol/water mixture.

Example 7

TFE/PPVE copolymer powder (125 g), prepared generally according to U.S. Pat. No. 3,528,954, and having about 1.3 mol % PPVE and MFR of about 1.9 g/10 min as measured by ASTM D-3307, was combined with 0.775 g of maleic anhydride dissolved in acetone and then dried as in Example 5. Aliquots of this coated powder were irradiated with 3 Mrad and with 6 Mrad doses. Irradiated samples were extracted with acetone to remove any ungrafted maleic anhydride. FTIR scans of the irradiated samples (with the scan of an uncoated, irradiated TFE/PPVE sample subtracted to emphasize the grafted absorbance) showed absorbances at about 1792 cm$^{-1}$. Use of the grafted TFE/PPVE powder at the interface between TFE/PPVE copolymer and aluminum improved the adhesion of the former to the latter.

Example 8

The procedure of Example 1 was repeated, except that dichloromaleic anhydride was used instead of maleic anhydride. FTIR analysis showed a peak at about 1789 cm$^{-1}$ indicating that grafting had occurred.

Example 9

The procedure of Example 1 was repeated, except that poly(vinyl fluoride) powder (PVF resin grade PV116, DuPont Co.) was used instead of ETFE powder. FTIR analysis showed a peak at about 1782 cm$^{-1}$ indicating that grafting had occurred.

Example 10

A laminate of ETFE fluoropolymer (1.5 mm thickness) and grafted ETFE powder prepared as in Example 1 (0.1 mm thickness) was first prepared. Then, this two-component laminate was laminated to a 0.6 mm thickness of a thermoplastic polyester elastomer compositon containing 79.8 wt % Hytrel® grade HTR-8241 (DuPont Co.), 12 wt % ethylene/ethyl acrylate/maleic anhydride copolymer (Lotader® 4700, CDF Chimie), 8 wt % ethylene/ethyl acrylate/glycidyl methacrylate copolymer (Lotader® AX 8660, CDF Chimie), and 0.2 wt % of polymeric tertiary amine catalyst (Chimassorb® 944 LD, Ciba-Geigy Corp.), with the grafted ETFE against the polyester. The three-layer laminate was made in a press with platen temperature of 300° C. on the ETFE side and 270° C. on the polyester side, with preheating for 60 s with slight platen contact, then molding for 60 s, followed by cooling for 180 s under pressure. Average peel force for strips 1.5 cm wide was 17.3 N. For similar laminates prepared without the amine in the polyester elastomer composition, peel force was about 25% as high. This laminate can be made by co-extrusion through an annular die to form tubing (hose) in which the ETFE fluoropolymer forms the inner layer and the elastomer forms the outer layer, these layers being bonded together by melt mixed grafted powder.

Example 11

Laminates were prepared generally as in Example 10, except that the polyester elastomer composition contained 80 wt % of Hytrel® grade HTR-8241 and 20 wt % of ethylene/n-butyl acrylate/glycidyl methacrylate copolymer (EP 4934-1). Peel force was 7.9 N for 1.5 cm wide strips.

Example 12

The TFE/PPVE copolymer powder (100 g) used in Example 7 and 1 ml of CF$_2$=CF—[O—CF$_2$CF(CF$_3$)]—O—CF$_2$CF$_2$—COOCH$_3$ (EVE, prepared according to U.S. Pat. No. 4,138,426) were placed together in a sealed polyethylene bag and the sample was subjected to 6 Mrad total irradiation. A substantial peak at 1801 cm$^{-1}$ and a hydrocarbon peak at 2881 cm$^{-1}$ in the FTIR spectrum of the dried powder indicated the presence of EVE graft. Peel force was 1.3 lb (0.59 kg) in the test of adhesion to aluminum, compared to 0.5 lb (0.23 kg) for the ungrafted control.

Example 13

The procedure of Example 12 was generally repeated except that ETFE powder was used as the fluoropolymer powder instead of TFE/PPVE powder. FTIR analysis of a hot-pressed film showed a small absorbance at about 1790 cm$^{-1}$. Hydrocarbon absorbance by the ETFE itself precluded use of EVE methyl ester absorbance as an additional indicator of grafting. Peel force was 0.9 lb (0.40 kg) in the test of adhesion to aluminum, compared to 0.5 lb (0.23 kg) for the ungrafted control shown in Example 1.

Example 14

Three single-screw extruders were arranged to deliver streams of molten polymers to a slit die through a common crosshead, yielding a laminated film structure. The extruders are identified in Table 3. ETFE fluoropolymer resin having composition similar to that described above and MFR of about 20 g/10 min was pumped by Extruder A at a melt temperature of 303° C. A 6,6-polyamide (Zytel® nylon resin grade NC 010 E42A, DuPont Co.) was pumped by Extruder C at a melt temperature of 285° C. Extruder B pumped grafted ETFE fluoropolymer (powder) prepared generally as in Example 1 at a melt temperature of 280° C. as the intermediate layer of the laminate. The slit die had an orifice of 20 mm ×2 mm, was prolongated to give a contact length of about 150 mm from the point the three layers flowed together to the die exit, to ensure optimum adhesion between the tie layer (melt mixed grafted powder) and the bulk (outer) layers, and was equipped with pressure gauges separated by 100 mm in the melt flow direction. Die temperature was 310° C. Upstream and downstream pressures, respectively, were 2.5 and 1.2 MPa. Contact time in the die, calculated as the melt transit time between the pressure guages, was 3.8 s, and output was 56 g/min. The 2-mm laminate had outer layers that were each 0.9 mm thick, while the interlayer derived from grafted ETFE powder and bonding the ETFE fluoropolymer from Extruder A to the polyamide from Extruder B, was 0.2 mm thick.

Due to the stiffness of the polyamide, it was not possible to measure peel force as done in previous examples. Instead, a tensile test was used to evaluate adhesion at the laminate interfaces. The specimen was pulled at a very low speed of 5 mm/min until one of the outer layers of the laminate ruptured, and the interfaces were inspected for delamination. No delamination was detected at either interface, and the level of adhesion was judged as excellent even though the grafted ETFE fluoropolymer powder was melt-mixed in this test. A comparative laminate prepared as above except that Extruder B was turned off to omit the grafted ETFE interlayer. Poor adhesion was evidenced by extensive delamination at the ETFE/polyamide interface in the tensile test.

By using a cylindrical die for aforesaid co-extrusion instead of the slit die, laminates having tubular configurations are produced. Such tubular structures can be used as fuel hose, or as tubing in heat exchangers for cooling flue gas in power plants or waste incinerators.

Substitution of thermoplastic polyester elastomer composition for the polyamide component of aforesaid co-extrusion using a cylindrical die yields tubular structures that can be used as fuel hose, or as injection/hydraulic control lines in umbilicals for off-shore oil and gas operations. To accomplish this substitution, a melt temperature of about 270° C. is used for the thermoplastic polyester elastomer pumped by Extruder C.

TABLE 3

| Extruder Identity and Characteristics | | | |
|---|---|---|---|
| Extruder | Manufacturer | Diam. (mm) | L/D |
| A | Fairex | 45 | 26/1 |
| B | Brabender | 19 | 25/1 |
| C | Brabender | 19 | 25/1 |

Example 15

The procedure of Example 14 was essentially repeated, but with changes of materials fed by Extruders A and C, and of operating conditions. Extruder A pumped ETFE fluoropolymer, having MFR of about 3 g/10 min, at melt temperature of 329° C. Extruder C pumped an aromatic polyamide (Amodel® ET 1000 HSNT, Amoco) at melt temperature of 333° C. Melt temperature of the grafted ETFE fluoropolymer (powder) was 290° C. Die temperature was 325° C. Pressures were 2.8 and 0.9 MPa. Contact time was 2.7 s and output was 36 g/min. Laminate component layer thicknesses were the same as in Example 14. Again, no delamination was observed at either interface in the tensile test. A control prepared as for Example 14 did delaminate at the ETFE/polyamide interface in the tensile test.

What is claimed is:

1. A process for grafting a grafting compound onto the surface of a fluoropolymer powder, comprising exposing said powder to a source of ionizing radiation without swelling said powder in the presence of an ethylenically unsaturated compound present only at the surface of said powder.

2. The process of claim 1 wherein said ethylenically unsaturated compound contains polar functional groups.

3. The process of claim 1 wherein said grafting compound and said fluoropolymer powder are contained in a closed container transparent to said ionizing radiation during said exposure.

4. Process for bonding fluoropolymer to another material, comprising bringing said fluoropolymer and said material together, in contact with one another, said fluoropolymer being either in the form of powder or melt mixture thereof, said powder having a compound grafted only to the surface thereof, either the grafted compound portion of said powder being compatible with said material or the fluoropolymer portion of said powder being compatible with said material, and heating the resultant assemblage of said material and said powder or melt mixture thereof to cause said material and said fluoropolymer to bond together.

5. The process of claim 4 wherein said heating is done prior to bringing said powder or melt mixture thereof and said material together.

6. The process of claim 4 wherein an additional material is present in contact with said powder or melt mixture thereof, either the grafted compound portion of said powder being compatible with said additional material or the fluoropolymer portion of said powder being compatible with said additional material, said heating causing said another material and said additional material to be bonded together by said powder or melt mixture thereof.

7. The process of claim 6 wherein said additional material is brought into contact with said powder or melt mixture thereof prior to said heating of said resultant assemblage or subsequent to said heating of said resultant assemblage.

8. The process of claim 6 wherein said materials to be bonded together are matrix material and filler material dispersed therein, and said powder is present at the interface between said matrix material and said filler material.

9. The product of the process of claim 8.

10. The process of claim 4 wherein said heated assemblage is forced together to assist formation of said bond.

11. A laminate prepared by the process of claim 4 comprising grafted fluoropolymer powder, either fused or melt mixed, bonded to another material, either the grafted compound portion of said powder being compatible with said material or the fluoropolymer portion of said powder being compatible with said material or the fluoropolymer portion of said powder being compatible with said material.

12. The laminate of claim 11 wherein an additional material is bonded to said fused or melt mixed powder, either the grafted compound portion of said powder being compatible with said additional material or the fluoropolymer portion of said powder being compatible with said additional material.

13. The laminate of claim 12 wherein said another material and said additional material are different materials.

14. The laminate of claim 13 wherein at least one of said materials is fluoropolymer.

15. The laminate of claim 14 wherein one of said materials is fluoropolymer and the other of said materials is other than fluoropolymer.

16. The laminate of claim 15 wherein said fluoropolymer is ETFE copolymer, said additional material comprises thermoplastic polyester elastomer, and the base fluoropolymer of said grafted fluoropolymer powder is ETFE copolymer either the same as or different from said fluoropolymer.

17. The laminate of claim 16 wherein said additional material includes amine catalyst.

18. The laminate of claim 12 having tubular configuration.

19. The tubular laminate of claim 18 as a fuel hose, heat exchanger tubing, or injection/hydraulic control hose.

* * * * *